US008847583B2

(12) United States Patent
Sasaki et al.

(10) Patent No.: US 8,847,583 B2
(45) Date of Patent: Sep. 30, 2014

(54) ELECTROMAGNETIC INDUCTION TYPE ABSOLUTE POSITION MEASURING ENCODER

(75) Inventors: Kouji Sasaki, Kawasaki (JP); Osamu Kawatoko, Kawasaki (JP)

(73) Assignee: Mitutoyo Corporation, Kawasaki-Shi (JP)

( * ) Notice: Subject to any disclaimer, the term of this patent is extended or adjusted under 35 U.S.C. 154(b) by 127 days.

(21) Appl. No.: 13/564,141

(22) Filed: Aug. 1, 2012

(65) Prior Publication Data

US 2013/0033257 A1   Feb. 7, 2013

(30) Foreign Application Priority Data

Aug. 3, 2011  (JP) .................................. 2011-170510

(51) Int. Cl.
*H01F 5/00* (2006.01)
*G01D 5/20* (2006.01)
*G01D 1/00* (2006.01)
*H01F 1/00* (2006.01)

(52) U.S. Cl.
CPC ................ *G01D 5/2086* (2013.01); *H01F 1/00* (2013.01); *G01D 1/00* (2013.01)
USPC ............ 324/207.17; 324/207.18; 324/207.19; 324/207.2; 324/207.21

(58) Field of Classification Search
CPC .......... G01D 1/00; H01F 1/00; H01F 2003/00
USPC ........................................ 324/207.11–207.26
See application file for complete search history.

(56) References Cited

U.S. PATENT DOCUMENTS

| 6,522,129 B2 * | 2/2003 | Miyata et al. | 324/207.17 |
| 2007/0001666 A1 * | 1/2007 | Lee | 324/207.15 |
| 2009/0021245 A1 * | 1/2009 | Lee | 324/207.16 |
| 2009/0195241 A1 * | 8/2009 | Nakayama et al. | 324/207.17 |
| 2010/0127696 A1 * | 5/2010 | Huber et al. | 324/207.21 |

FOREIGN PATENT DOCUMENTS

| JP | 10-318781 | 12/1998 |
| JP | 2003-121206 | 4/2003 |
| JP | 2009-186200 | 8/2009 |

* cited by examiner

*Primary Examiner* — Huy Q Phan
*Assistant Examiner* — Temilade S Rhodes-Vivour
(74) *Attorney, Agent, or Firm* — Rankin, Hill & Clark LLP (57) ABSTRACT

An electromagnetic induction type absolute position measuring encoder having two or more rows of scale coils, each of the rows having a scale pitch different from that of another row; a transmitter coil and a receiver coil arranged on a grid that is movable relative to the scale in the measuring direction so as to face the scale coils; and the track is constituted by the scale coils, the transmitter coil and the receiver coil. The encoder is capable of measuring an absolute position of the grid with respect to the scale from a flux change detected at the receiver coil via the scale coils when the transmitter coil is excited, in which at least one loop-shaped additional scale coil is added between the scale coils in at least one of the tracks.

15 Claims, 14 Drawing Sheets

PRIOR ART

ELECTROMAGNETIC INDUCTION TYPE ABSOLUTE POSITION MEASURING ENCODER

CROSS-REFERENCE TO RELATED APPLICATION

The disclosure of Japanese Patent Application No. 2011-170510 filed on Aug. 3, 2011 including specifications, drawings and claims are incorporated herein by reference in its entirety.

TECHNICAL FIELD

The present invention relates to an electromagnetic induction type absolute position measuring encoder, and, in particular, to an electromagnetic induction type absolute position measuring encoder suitable for use in a electronic digital caliper, an indicator, a linear scale, a micrometer, or the like, and capable of achieving a high precision in measurement due to an improvement in S/N ratio and/or capable of reducing a scale width and therefore an encoder width.

BACKGROUND ART

Figure 1:
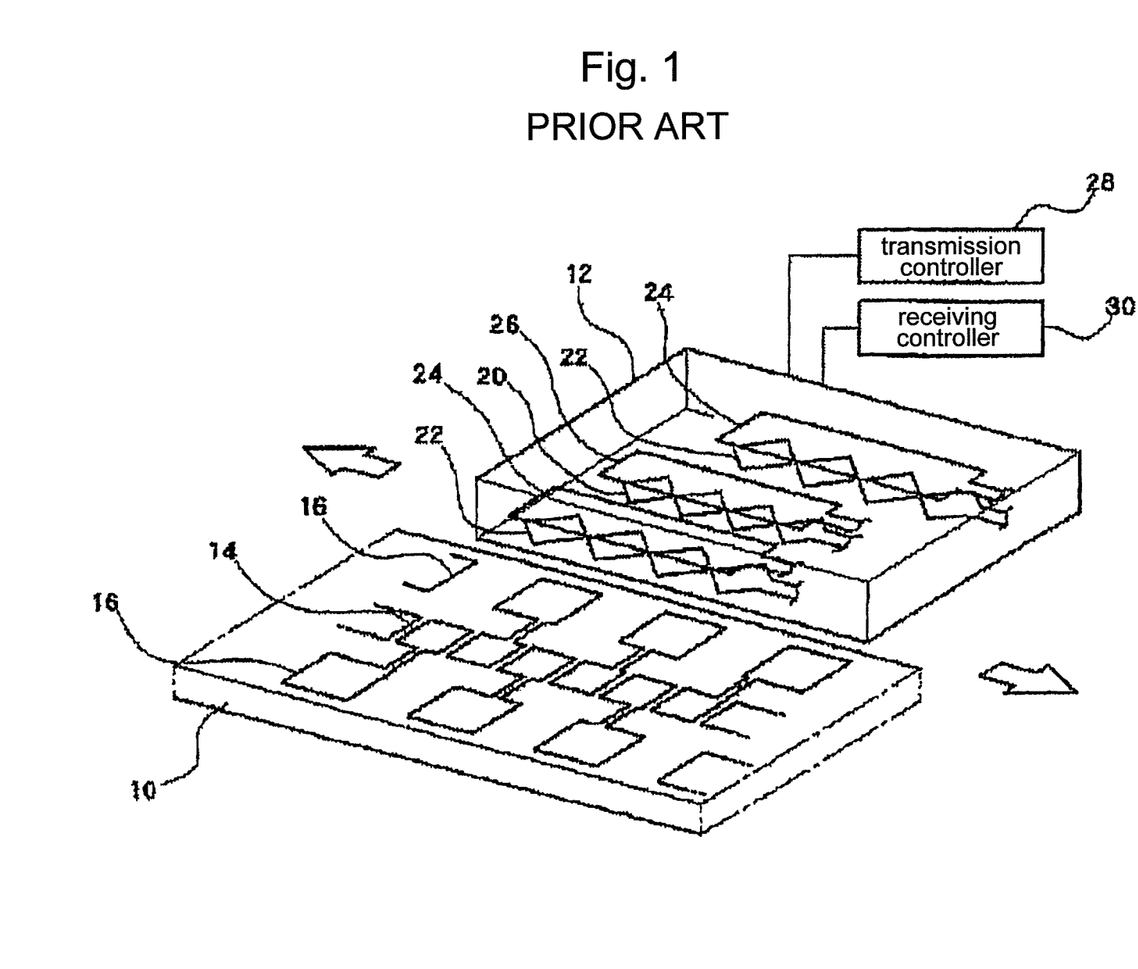
FIG. 1 is a perspective view showing the entire configuration of a conventional electromagnetic induction type encoder described in Patent Literature 2.

As described in Japanese Patent Application Laid-Open No. Hei. 10-318781 (hereinafter referred to as Patent Literature 1) or in Japanese Patent Application Laid-Open No. 2003-121206 (hereinafter referred to as Patent Literature 2), there is known an electromagnetic induction type encoder as in FIG. 1 showing an example of Patent Literature 2. The electromagnetic induction type encoder includes: a large number of scale coils 14 and 16 arranged on a scale 10 along a measuring direction thereof; and transmitter coils 24 and 26 and receiver coils 20 and 22 arranged on a grid (also referred to as a slider) 12 capable of moving relative to the scale 10 in the measuring direction. The electromagnetic induction type encoder detects an amount of relative movement between the scale 10 and the grid 12 from a flux change detected at the receiver coil via the scale coil when the transmitter coil is excited. In this figure, reference numeral 28 denotes a transmission controller, and 30 denotes a receiving controller.

Figure 2:
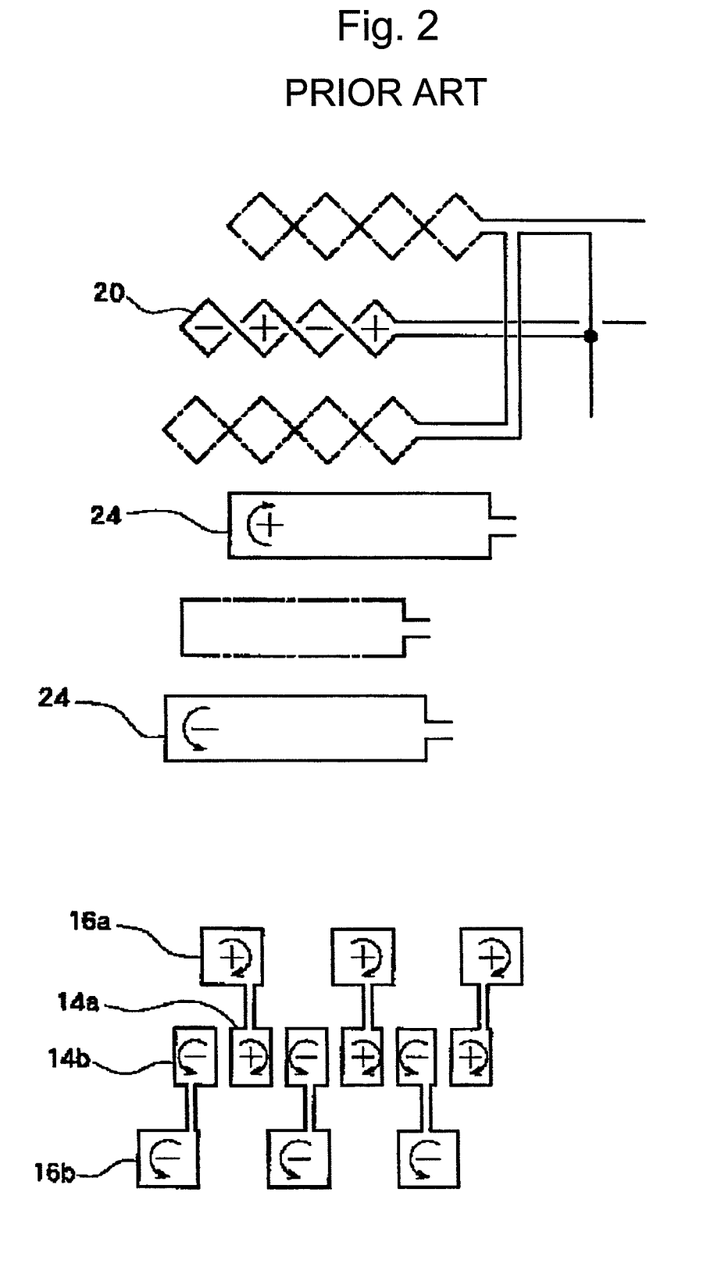
FIG. 2 is a plan view similarly showing an arrangement and a first function of coils on a grid.
Figure 3:
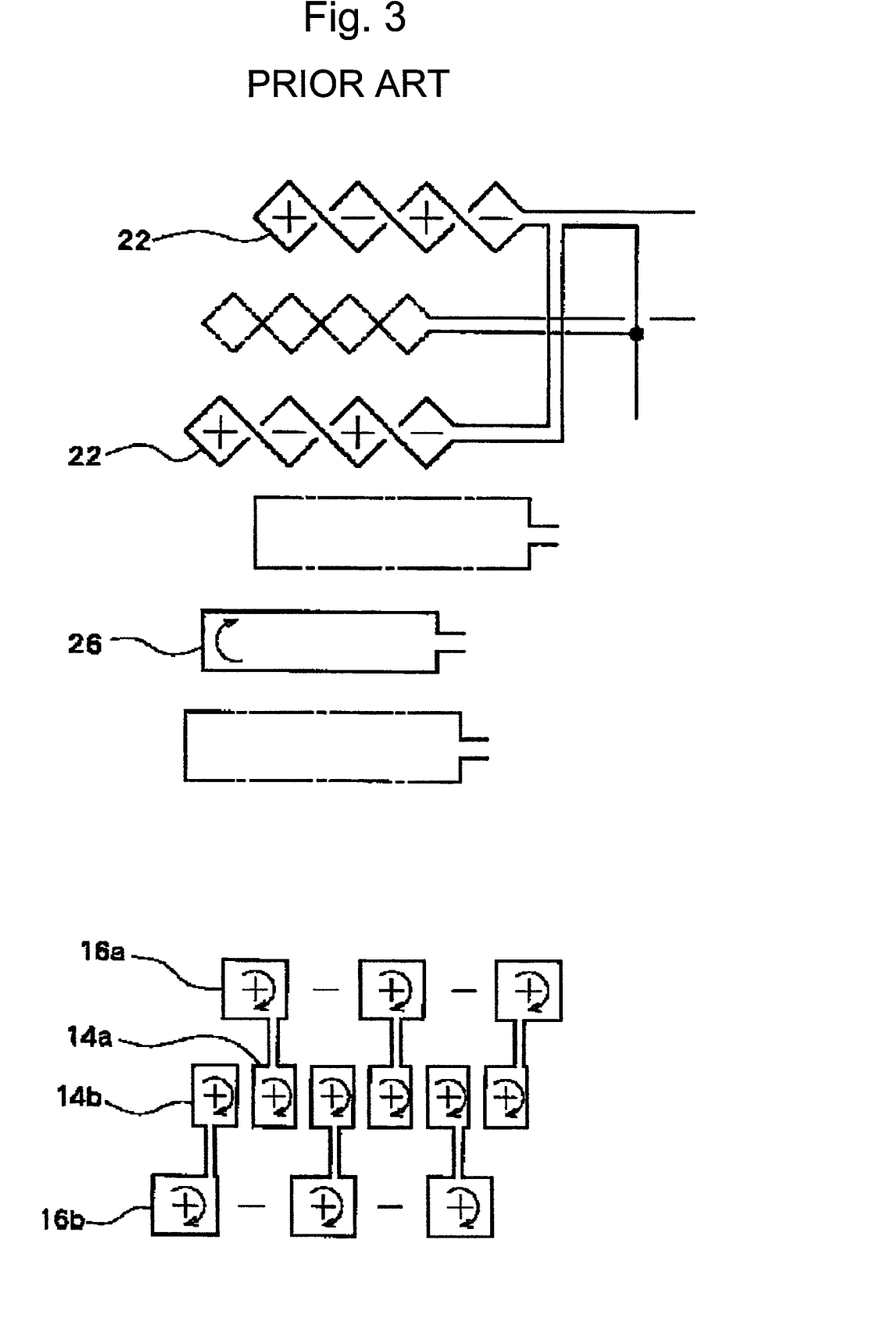
FIG. 3 is a plan view similarly showing an arrangement and a second function of coils on a grid.

As shown in FIG. 2, in order to reduce an offset, which is an excess signal, in such an electromagnetic induction type encoder, an offset has been reduced by placing the receiver coil 20 at a portion where magnetic fields generated by the transmitter coils 24 are cancelled out to be net zero (a central portion between the transmitter coils on the both sides thereof in the example of FIG. 2). Note that in Patent Literature 2, the second receiver coils 22 are also arranged on the both sides of the second transmitter coil 26 as shown in FIG. 3 in addition to the configuration formed by the first transmitter coils 24 and the first receiver coil 20 shown in FIG. 2.

However, this configuration requires three rows of scale coils, and the line length of the scale coils therefore becomes long. Thus, there is the problem that the generated induced current is attenuated due to an impedance of the scale coil itself and it is therefore difficult to obtain a strong signal.

Figure 4:
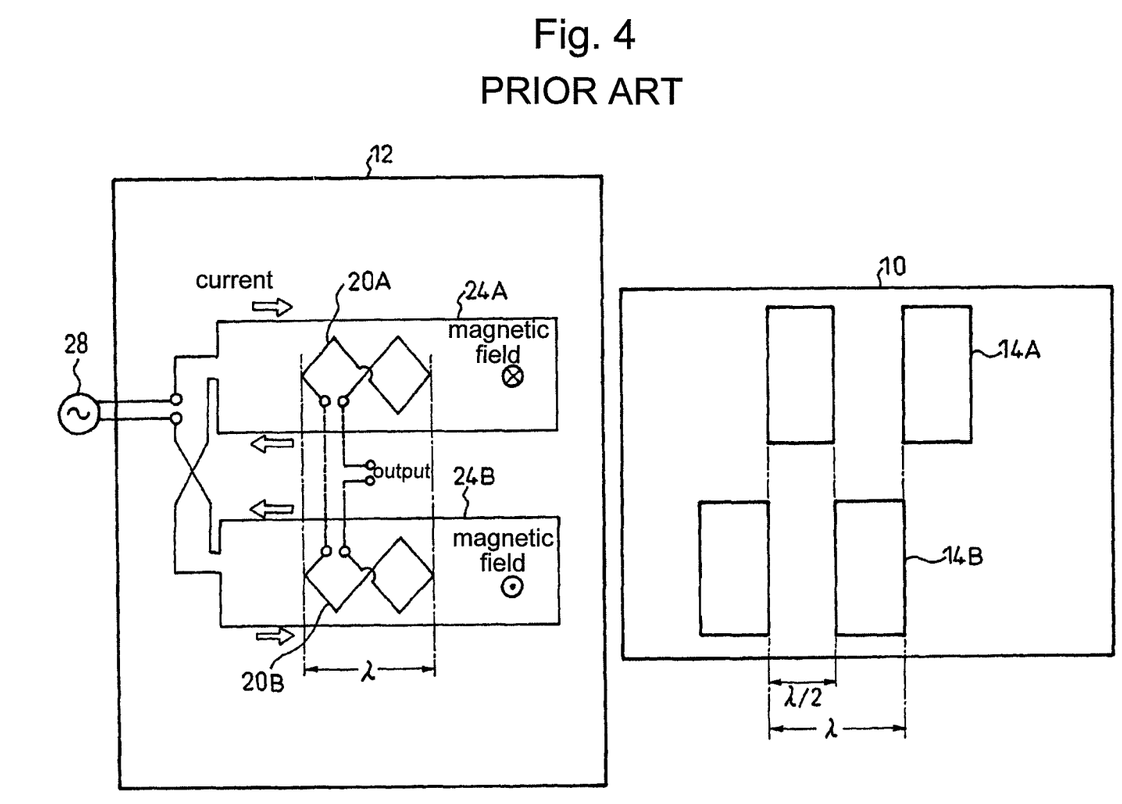
FIG. 4 is a plan view showing a grid and a scale of a conventional electromagnetic induction type encoder described in Patent Literature 3.

In order to solve such a problem, the present applicant has suggested in Japanese Patent Application Laid-Open No. 2009-186200 (hereinafter referred to as Patent Literature 3) that a plurality of sets of transmitter coils 24A and 24B, receiver coils 20A and 20B, and scale coils 14A and 14B are arranged symmetrically with respect to the center of the scale 10, and one of the scale coils symmetrically positioned with respect to the scale center (14A, for example) has a positional relationship shifted from the other one of the scale coils (14B, for example) by a ½ phase of a scale pitch λ as shown in FIG. 4 of the present application corresponding to FIG. 6 in Patent Literature 3.

Figure 5:
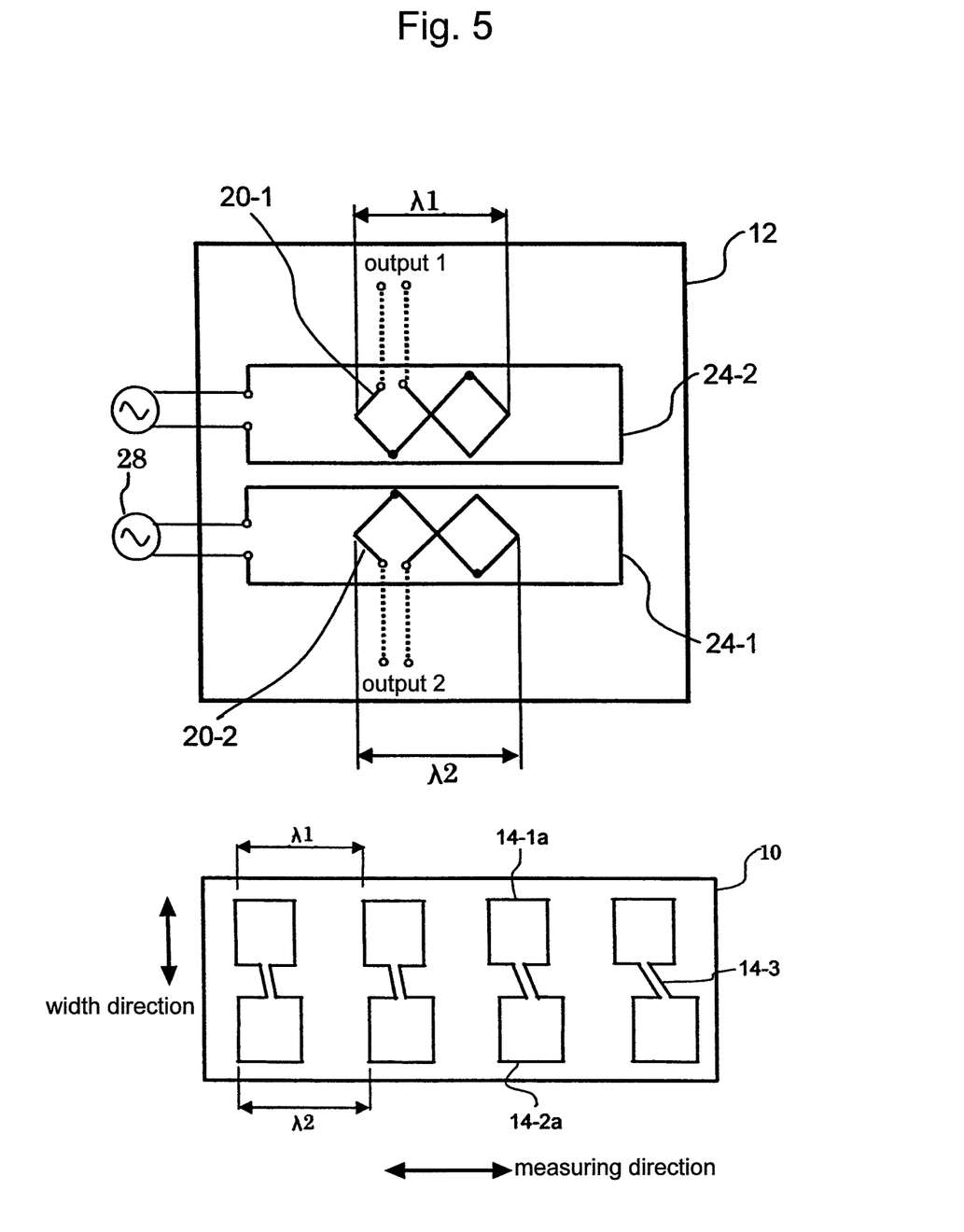
FIG. 5 is a plan view of a grid and a scale showing a basic configuration of an electromagnetic induction type absolute position measuring encoder under consideration by the present inventor.

Furthermore, as shown in FIG. 5, it is conceivable to enable absolute position measurement by placing two sets of a track including scale coils, a transmitter coil, and a receiver coil in a scale width direction (grid width direction) with different scale pitches of λ1 and λ2. The two sets includes a set formed by a transmitter coil 24-1 on the lower side of the figure, and scale coils 14-1a and a receiver coil 20-1 at the scale pitch λ1 on the upper side of the figure and a set formed by a transmitter coil 24-2 on the upper side of the figure, and scale coils 14-2a and a receiver coil 20-2 at the scale pitch λ2 on the lower side of the figure. In this figure, reference numeral 14-3 denotes a coil for connecting the scale coil 14-1a with the scale coil 14-2a (referred to as a connecting coil).

With the configuration of FIG. 5, however, the receiver coil 20-1 (20-2) and the transmitter coil 24-1 (24-2) need to be placed at positions spaced apart from each other in order to reduce a direct crosstalk amount from the transmitter coil 24-1 or 24-2 to the receiver coil 20-2 or 20-1 on the grid 12. Thus, a length of the scale coils on the scale 10 (a length of the scale coil 14-1a+a length of the scale coil 14-2a+a length of the connecting coil 14-3) becomes long, resulting in attenuation of generated induced current Ia due to the impedance of the scale coil itself. Thus, there is the problem that a strong signal is difficult to be obtained.

Moreover, if it is attempted with the configuration of FIG. 5 to reduce the encoder width, for example, by reducing a space between the scale coils 14-1a and 14-2a, a magnetic field generated by the driving of the transmitter coil also directly affects the scale coil directly facing the receiver coil. As a result, there is generated an induced current component in a direction opposite to that of the normal induced current flowing through the scale coil, thereby reducing an induced current generated in the scale coil. This leads to the problem of a decrease in signals detected at the receiver coil.

A description thereof will be given below.

Figure 6:
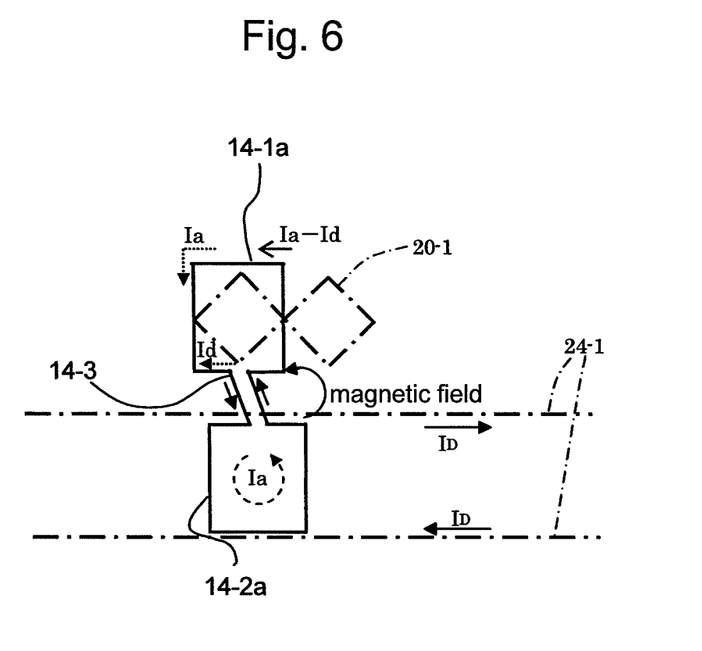
FIG. 6 is a plan view of a main section illustrating how a transmitter coil on a lower side of FIG. 5 is driven to perform detection at a receiver coil on an upper side thereof.

FIG. 6 shows an operation of detecting the scale coils 14-1a at the scale pitch λ1 on the upper side of FIG. 5 by the receiver coil 20-1. As shown in the figure, the principle of the detection is essentially such that a magnetic field generated by the driving of the transmitter coil 24-1 with a driving current $I_D$ leads to the generation of the induced current Ia at the scale coil 14-2a and a magnetic field generated by the induced current Ia flowing through the scale coil 14-1a via the connecting coil 14-3 is then detected by the receiver coil 20-1. As the scale coil 14-1a approaches to the transmitter coil 24-1, however, an induced current component Id in a direction opposite to that of the induced current Ia is generated at the scale coil 14-1a due to the magnetic field generated by the driving of the transmitter coil 24-1. As a result, the total induced current at the scale coil 14-1a becomes (Ia−Id), i.e., a reduction by an amount of Id. In other words, the induced current (Ia−Id) corresponding to a difference between the induced current component Ia via the scale coil 14-2a and the induced current component Id (in the direction opposite to that of Ia) generated by the magnetic field directly entered into the scale coil 14-1a from the transmitter coil 24-1 are generated at the scale coil 14-1a.

Figure 7:
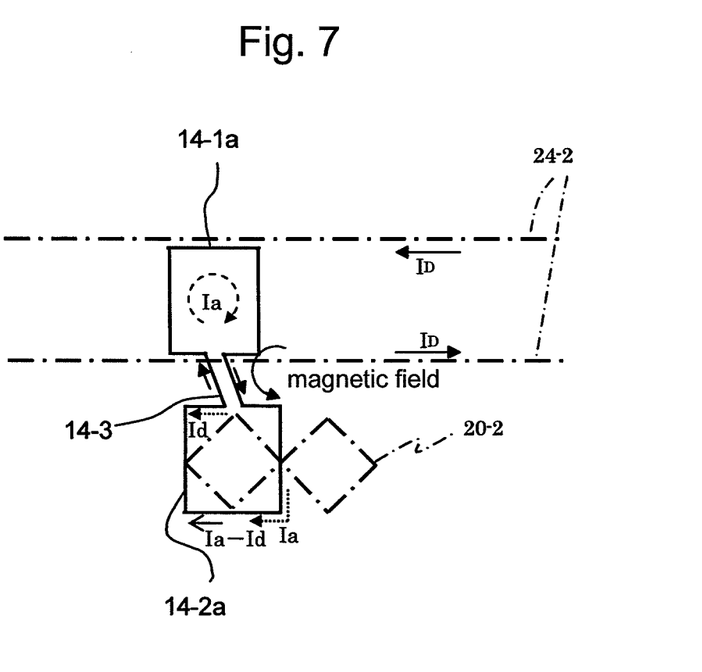
FIG. 7 is a plan view of a main section illustrating how a transmitter coil on the upper side of FIG. 5 is driven to perform detection at a receiver coil on the lower side thereof.

On the other hand, FIG. 7 shows an operation of detecting the scale coil 14-2a on the lower side of FIG. 5 at the scale pitch λ2 by the receiver coil 20-2. As shown in this figure, the principle of the detection is essentially such that a magnetic field generated by the driving of the transmitter coil 24-2 with the driving current $I_D$ leads to the generation of the induced current Ia at the scale coil 14-1a and a magnetic field generated by the induced current Ia flowing through the scale coil 14-2a via the connecting coil 14-3 is then detected by the receiver coil 20-2. As the scale coil 14-2a approaches to the transmitter coil 24-2, however, the induced current component Id in the direction opposite to that of the induced current Ia is generated at the scale coil 14-2a due to the magnetic field generated by the driving of the transmitter coil 24-2. As a result, the total induced current at the scale coil 14-2a becomes (Ia−Id), i.e., a reduction by an amount of Id. In other words, the induced current (Ia−Id) corresponding to a difference between the induced current component Ia via the scale coil 14-1a and the induced current component Id (in the direction opposite to that of Ia) generated by the magnetic field directly entered into the scale coil 14-2a from the transmitter coil 24-2 are generated at the scale coil 14-2a.

Further, if it is attempted with the configuration of FIG. 5 to reduce the encoder width, for example, by reducing the space between the scale coils 14-1a and 14-2a, the following disadvantage also occurs.

Figure 8:
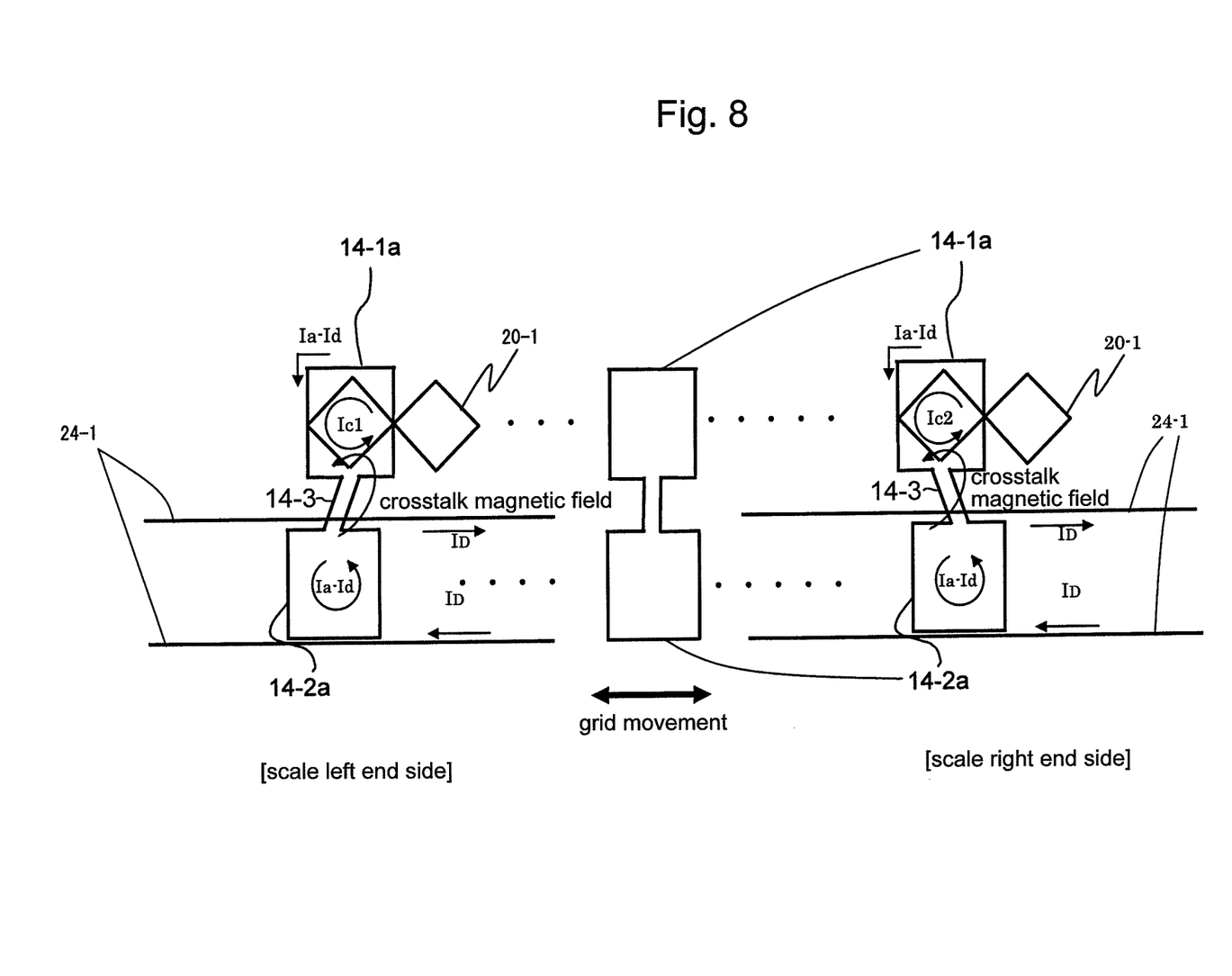
FIG. 8 is a plan view of a main section illustrating occurrences of induced currents due to crosstalk magnetic fields in a conventional example.

In other words, as shown in FIG. 8, a magnetic field generated by the induced current (Ia−Id) flowing through the scale coil 14-2a directly affects the receiver coil 20-1, and a crosstalk current component Ic (Ic1 at the left end side of the scale on the left side of FIG. 8) therefore flows through the receiver coil 20-1.

In a case of the scale having the two-track configuration with different scale pitches as shown in FIG. 5, the crosstalk current component generated at the receiver coil 20-1 varies depending on a position of the scale (Ic2 at the right end side of the scale on the right side of FIG. 8). Thus, the crosstalk current component, which varies depending on a position in the measuring direction of the scale, is superimposed on a true position detection signal, thereby causing a problem of affecting a measurement accuracy (in particular, a wide range accuracy) over the entire length of the scale.

Figure 9:
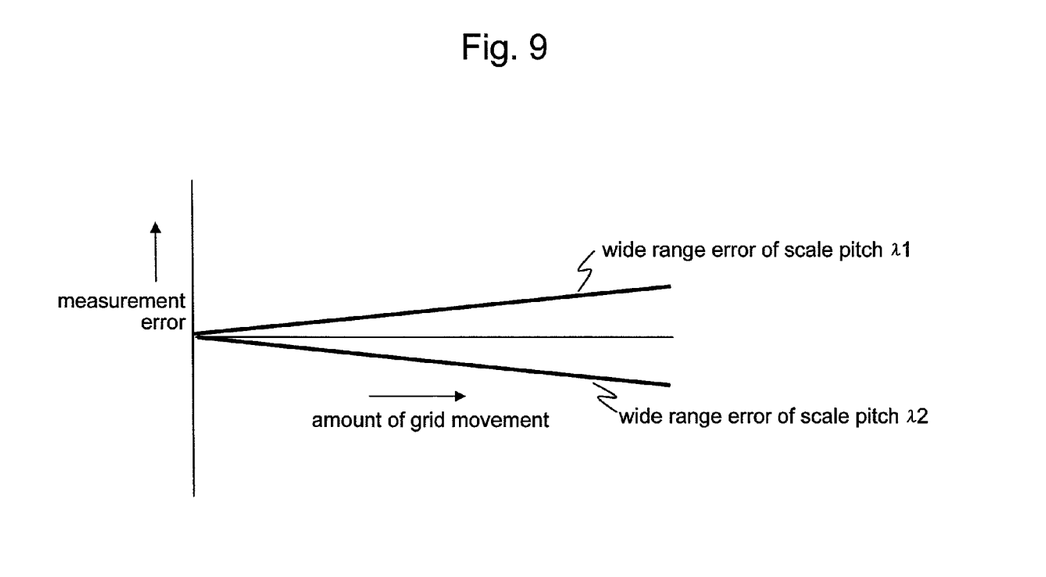
FIG. 9 is a graph similarly showing an example of wide range errors.

In the scale of FIG. 5 having tracks with the scale pitch $\lambda 1$ and the scale pitch $\lambda 2$ ($\lambda 1 < \lambda 2$ in this example) respectively, if the scale at the scale pitch $\lambda 1$ is detected (measured) by the receiver coil 20-1 as in the example of FIG. 8, the wide range accuracy thereof has errors in a plus direction as shown in FIG. 9 due to the effect of the scale at the scale pitch $\lambda 2$. If the scale at the scale pitch $\lambda 2$ is detected (measured) by the receiver coil 20-2, on the other hand, the wide range accuracy thereof has errors in a minus direction as shown in FIG. 9 due to a cause similar to that described above, i.e., the effect of the scale at the scale pitch $\lambda 1$.

SUMMARY OF INVENTION

Technical Problem

The present invention has been made in order to solve the above-described problems in the conventional technique, and an object thereof is to improve a detection signal strength at a receiver coil by increasing an induced current in a scale coil when a transmitter coil is excited and thereby achieve a high measurement precision due to an improvement in S/N ratio and/or to downsize an encoder by reducing a scale width thereof and therefore an encoder width thereof, as well as to improve a wide range accuracy by reducing an induced current due to a crosstalk magnetic field.

Solution to Problem

The present invention solves the above-described problems by an electromagnetic induction type absolute position measuring encoder having two or more tracks, the encoder including: two or more rows of scale coils, each of the rows including a large number of scale coils arranged on a scale along a measuring direction so as to have a scale pitch different from that of another row; a transmitter coil and a receiver coil arranged on a grid movable relative to the scale in the measuring direction so as to face the scale coils; and the track constituted by the scale coils, the transmitter coil and the receiver coil, and capable of measuring an absolute position of the grid with respect to the scale from a flux change detected by the receiver coil via the scale coils when the transmitter coil is excited, wherein at least one loop-shaped additional scale coil is added between the scale coils in at least one of the tracks.

Here, the scale coil (hereinafter, sometimes referred to as the "original scale coil") may have a coil length twice or more as long as a coil length of the additional scale coil.

Furthermore, the receiver coil may have a shape covering both of the original scale coil and the additional scale coil.

Furthermore, the shape of the receiver coil may be a figure of eight with the top and bottom direction of the figure of eight coinciding with the measuring direction.

Furthermore, a signal strength detected at the receiver coil may be increased to (Ia+Id)/(Ia−Id) times more than or equal to a signal strength obtained when no additional scale coil is added, where Id is an induced current component generated by a magnetic field directly entered into the original scale coil on the row to be measured from the transmitter coil, and Ia is an induced current component via the original scale coil on the other row.

Furthermore, a line width of the additional scale coil may be adjusted so as to cancel out induced currents due to crosstalk magnetic fields from the scale coils to the receiver coil.

Furthermore, a line width of the scale coil may be changed in accordance with a position in the measuring direction of the scale so as to cancel out induced currents due to crosstalk magnetic fields from the scale coils to the receiver coil.

Furthermore, three or more rows of the scale coils may be provided.

Furthermore, the scale coils may include first scale coils arranged at a scale pitch $\lambda 1$, and second scale coils arranged at a scale pitch $\lambda 2$ different from the scale pitch $\lambda 1$ disposed on either side of the first scale coils, and further include an additional scale coil added only between the second scale coils disposed on either side of the first scale coils while no additional scale coil is added in the first scale coils at the center.

Furthermore, the shape of the scale coil may be a rectangular frame shape.

Advantageous Effects of Invention

According to the present invention, it is possible to increase the signal detection strength at the receiver coil when the transmitter coil is excited due to the induced current of the additional scale coil added between the original scale coils and to reduce the induced current due to the crosstalk magnetic field as compared to the configuration of FIG. 5. Therefore, there are provided advantageous effects such as (1) it becomes possible to reduce a space between two or more tracks and thus to downsize an encoder by reducing a scale width and accordingly an encoder width, (2) a measurement accuracy can be improved by an improvement in S/N ratio, (3) a gap between a grid and a scale can be widened, (4) it becomes possible to reduce a width of a scale coil and thus to downsize an encoder by reducing a scale width and accordingly an encoder width, and (5) a wide range accuracy can be improved by reducing an effect of a crosstalk magnetic field.

These and other novel features and advantages of the present invention will become apparent from the following detailed description of preferred embodiments.

BRIEF DESCRIPTION OF DRAWINGS

The preferred embodiments will be described with reference to the drawings, wherein like elements have been denoted throughout the figures with like reference numerals, and wherein.

DESCRIPTION OF EMBODIMENTS

Embodiments of the present invention will be described below in detail with reference to the drawings.

Figure 10:
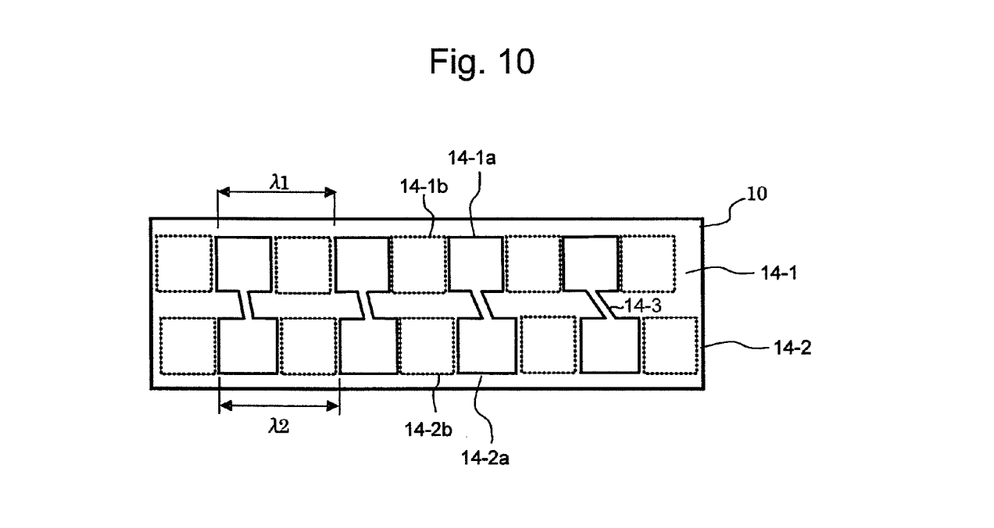
FIG. 10 is a plan view of a scale according to a first embodiment of the present invention.

As shown in FIG. 10, according to the first embodiment of the present invention, scale coils 14-1 are configured by adding scale coils (referred to also as additional scale coils) 14-1b shown by broken lines in the figure between the originally-provided scale coil main bodies (referred to also as original scale coils or main body scale coils) 14-1a similar to those shown in FIG. 5. Similarly, scale coils 14-2 are configured by adding scale coils (referred to also as additional scale coils) 14-2b shown by broken lines in the figure between the originally-provided scale coil main bodies 14-2a (referred to also as original scale coils or main body scale coils) similar to those shown in FIG. 5.

A reason why a signal strength detected at the receiver coil is increased with the above-described configuration even when an encoder width is reduced, for example, by reducing a space between the scale coils 14-1a and 14-2a will now be described below.

Figure 11:
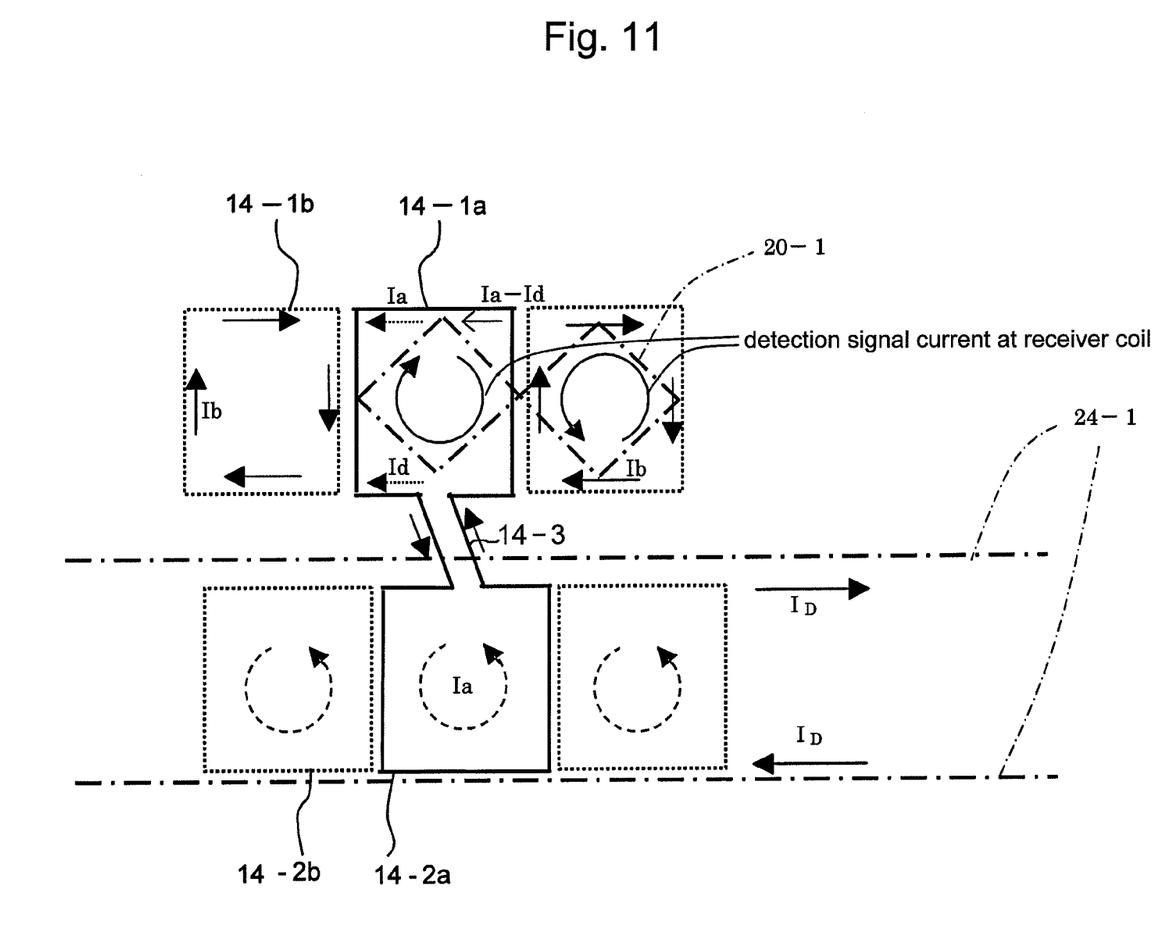
FIG. 11 is a plan view of a main section illustrating how a transmitter coil on a lower side of FIG. 10 is driven to perform detection at a receiver coil on an upper side thereof.

First, as shown in FIG. 11, when the scale coils 14-1 at the scale pitch λ1 positioned on the upper side of FIG. 10 are detected by the receiver coil 20-1, due to a magnetic field generated by the driving of the transmitter coil 24-1 with the driving current $I_D$, the induced current (Ia−Id) corresponding to a difference between the induced current component Ia via the main body scale coil 14-2a and the induced current component Id (in a direction opposite to that of Ia) generated by the magnetic field directly entered into the main body scale coil 14-1a from the transmitter coil 24-1 is generated at the main body scale coil 14-1a. Also, at the additional coil 14-1b, there is generated an induced current Ib (in a direction opposite to that of the induced current (Ia−Id) at the main body scale coil 14-1a) by a magnetic field directly entered thereto from the transmitter coil 24-1. When the magnitudes of the induced current Id and the induced current Ib are compared to each other, (the induced current Id)<(the induced current Ib/2) holds true since the coil length of the scale coils (14-1a+14-2a+14-3) is more than or equal to double the coil length of the additional scale coil 14-1b.

The receiver coil 20-1 has a coil shape in the figure of eight covering both of the main body coil 14-1a and the additional coil 14-1b with the top and bottom direction of the figure of eight coinciding with the measuring direction. Thus, a detection signal current at the receiver coil 20-1 is equal to that obtained by adding an induced signal current at the receiver coil 20-1 due to the current Ib of the additional scale coil 14-1b to an induced signal current at the receiver coil 20-1 due to the current (Ia−Id) of the main body scale coil 14-1a.

Thus, as shown in the following expressions, a signal strength A detected at the receiver coil 20-1 is increased to (Ia+Id)/(Ia−Id) times more than or equal to a signal strength B obtained when no additional scale coil 14-1b is added.

$$A \propto (Ia-Id+Ib) \approx (Ia-Id+2Id) = (Ia+Id)$$

$$B \propto (Ia-Id)$$

$$\therefore A/B \propto (Ia+Id)/(Ia-Id)$$

Figure 12:
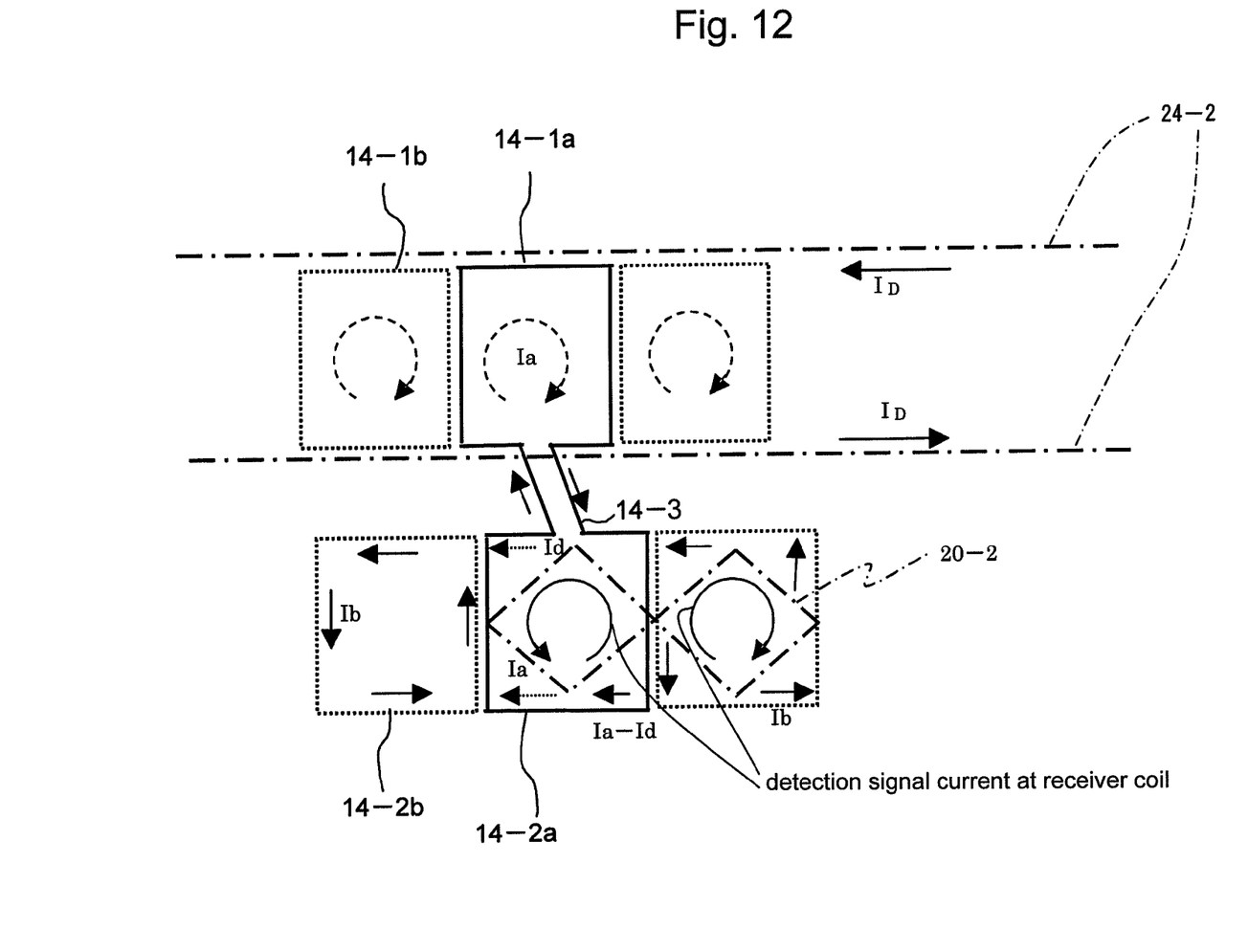
FIG. 12 is a plan view of a main section illustrating how a transmitter coil on the upper side of FIG. 10 is driven to perform detection at a receiver coil on the lower side thereof.

As shown in FIG. 12, when the scale coils 14-2 at the scale pitch λ2 positioned on the lower side of FIG. 10 are detected by the receiver coil 20-2, on the other hand, due to a magnetic field generated by the driving of the transmitter coil 24-2 with the driving current $I_D$, the induced current (Ia−Id) corresponding to a difference between the induced current component Ia via the main body scale coil 14-1a and the induced current component Id (in a direction opposite to that of Ia) generated by the magnetic field directly entered into the main body scale coil 14-2a from the transmitter coil 24-2 is generated at the main body scale coil 14-2a. Also, at the additional scale coil 14-2b, there is generated the induced current Ib (in the direction opposite to that of the induced current (Ia−Id) at the main body scale coil 14-2a) by a magnetic field directly entered thereto from the transmitter coil 24-2. When the magnitudes of the induced current Id and the induced current Ib are compared to each other, (the induced current Id)<(the induced current Ib/2) holds true since the coil length of the scale coils (14-2a +14-1a+14-3) is more than or equal to double the coil length of the additional scale coil 14-2b.

The receiver coil 20-2 has a coil shape in the figure of eight covering both of the main body scale coil 14-2a and the additional scale coil 14-2b with the top and bottom direction of the figure of eight coinciding with the measuring direction. Thus, a detection signal current at the receiver coil 20-2 is equal to that obtained by adding an induced signal current at the receiver coil 20-2 due to the current Ib of the additional scale coil 14-2b to an induced signal current at the receiver coil 20-2 due to the current (Ia−Id) of the main body scale coil 14-2a.

Thus, in a similar manner as that described above, a signal strength C detected at the receiver coil 20-2 is increased to (Ia+Id)/(Ia−Id) times more than or equal to the signal strength B obtained when no additional scale coil 14-2b is added as shown in the following expressions.

$$C \propto (Ia-Id+Ib) \cong (Ia-Id+2Id)=(Ia+Id)$$

$$B \propto (Ia-Id)$$

$$\therefore C/B \cong (Ia+Id)/(Ia-Id)$$

Figure 13:
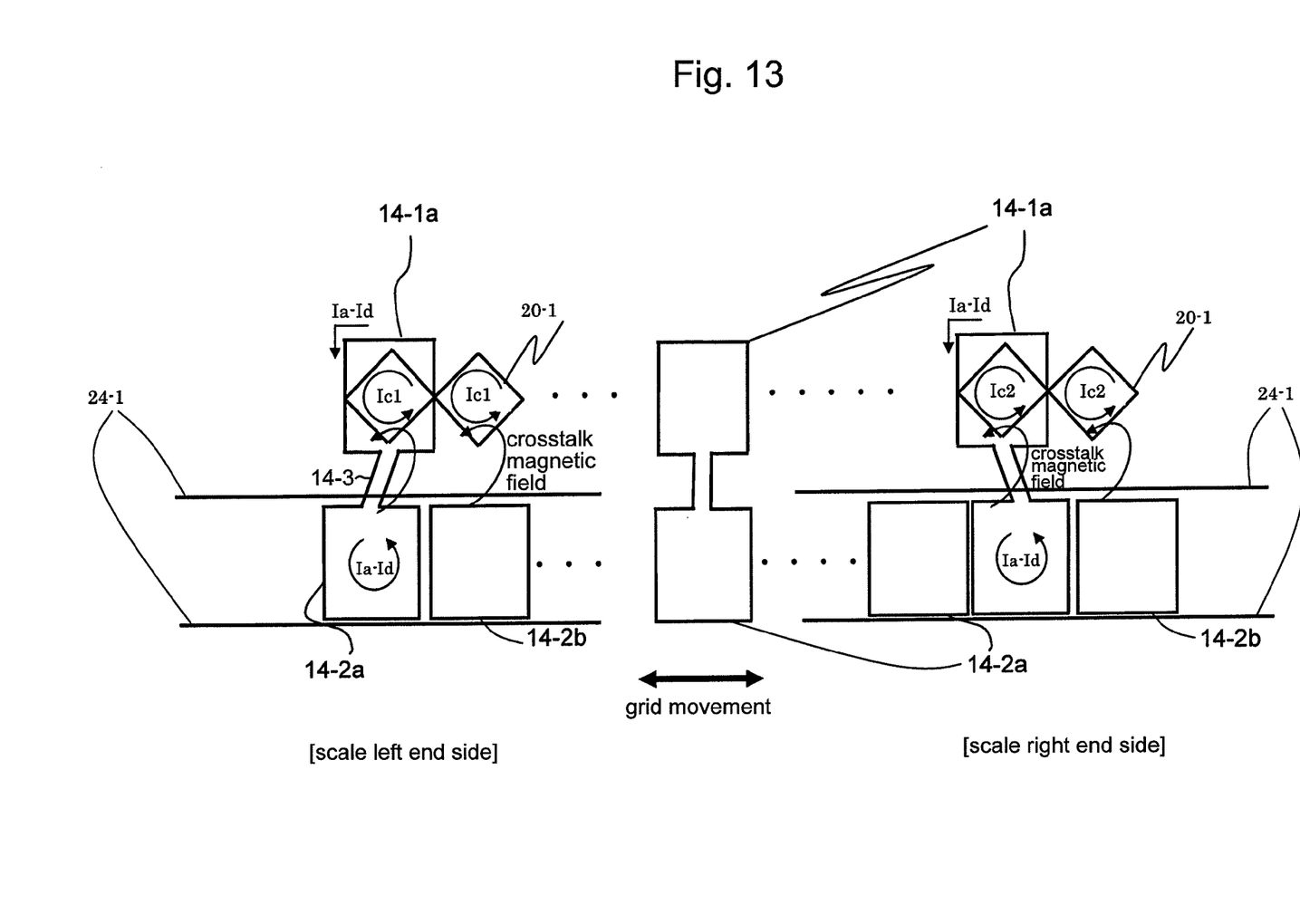
FIG. 13 is a plan view of a main section illustrating occurrences of induced currents due to crosstalk magnetic fields in the first embodiment.
Figure 14:
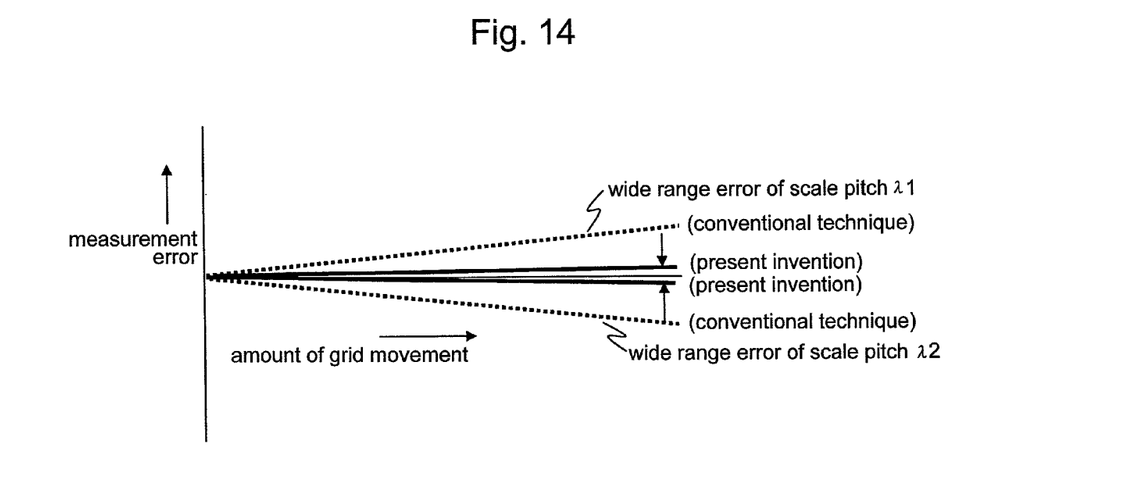
FIG. 14 is a graph similarly showing an example of wide range errors.

Further, with the addition of the loop-shaped scale coils (14-1b and 14-2b), as shown in FIG. 13, when the scale coils 14-1 at the scale pitch λ1 on the upper side of FIG. 10 are detected by the receiver coil 20-1, crosstalk magnetic fields from the scale coils 14-2 to the receiver coil 20-1 become substantially uniform without depending on a position of the scale in the measuring direction. As a result, a difference between the induced currents due to the crosstalk magnetic fields becomes small (Ic1≈Ic2), thereby improving the wide range accuracy as shown in FIG. 14. Also when the scale coils 14-2 at the scale pitch λ2 on the lower side of FIG. 10 are detected by the receiver coil 20-2, the wide range accuracy can be improved due to the similar action as shown in FIG. 14. In particular, when the receiver coil has a shape in the figure of eight with the top and bottom direction of the figure of eight coinciding with the measuring direction, the induced currents due to the crosstalk magnetic fields are cancelled out each other. As a result, the induced current generated at the receiver coil 20-1 is substantially reduced, thereby further improving the wide range accuracy.

Figure 15:
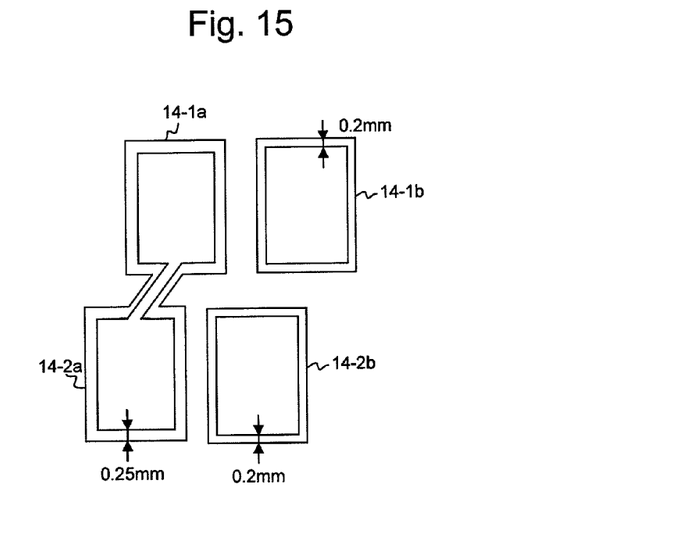
FIG. 15 is a plan view of a scale similarly showing a modification.
Figure 16:
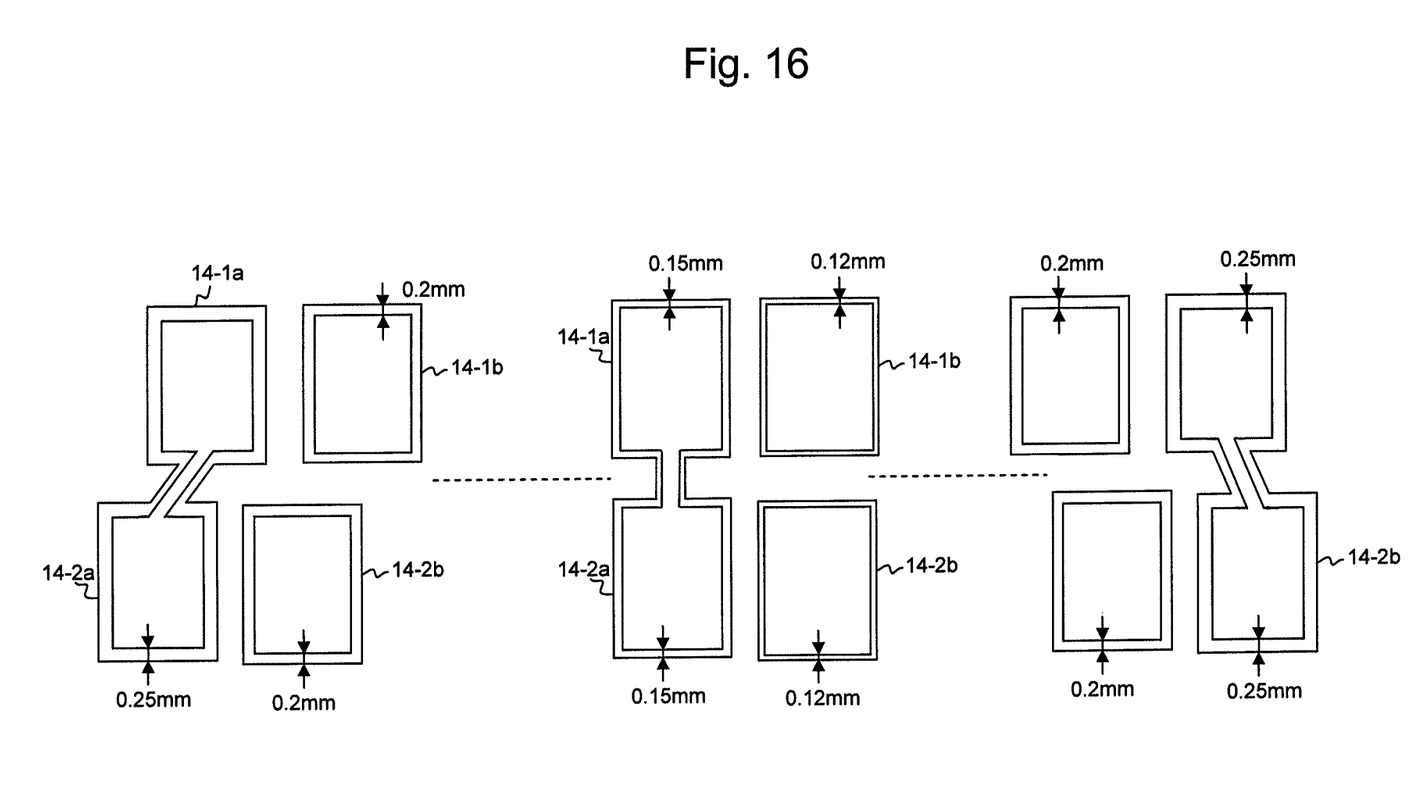
FIG. 16 is a plan view of a scale similarly showing another modification.

Further, as illustrated in FIG. 15 by way of example, the above-described induced currents can be completely cancelled out each other by adjusting a line width of the added scale coils (14-1b and 14-2b). Alternatively, as illustrated in FIG. 16 by way of example, a line width of the scale coil can be changed in accordance with the position of the scale in the measuring direction so as to satisfy Ic1=Ic2, thereby achieving a higher degree of accuracy.

Further, the application of the present invention is not limited to those including two rows of tracks as shown in FIG. 10. As in the second embodiment shown in FIG. 17, the present invention can also be applied, for example, to those including three rows of tracks in which the scale coils 14-2 at the scale pitch λ2 are arranged on the upper side and lower side of the scale coils 14-1 at the scale pitch λ1.

Figure 17:
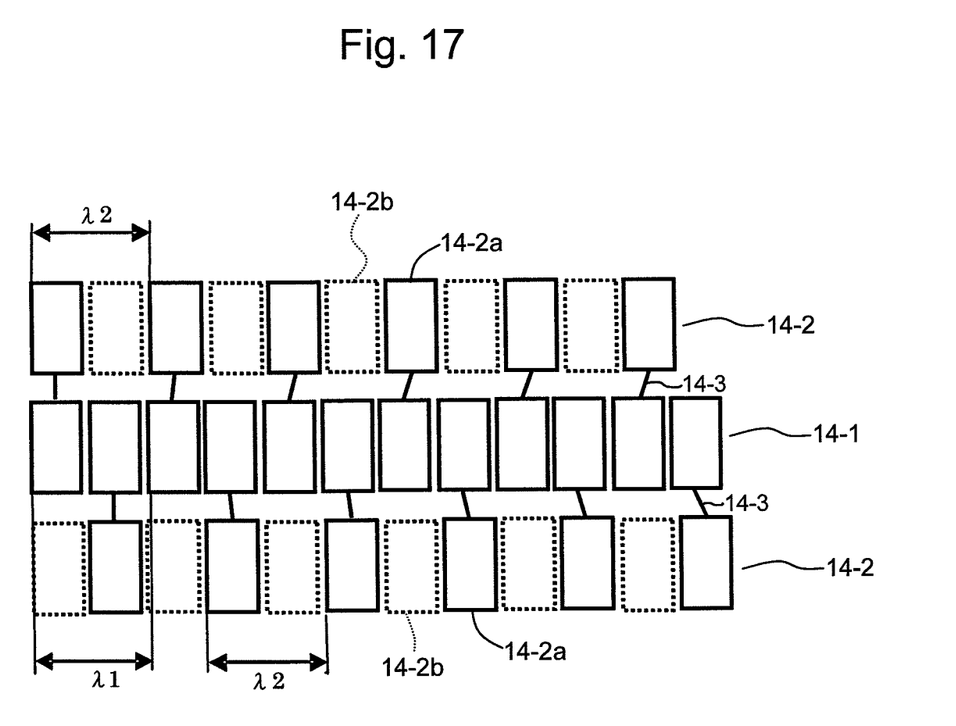
FIG. 17 is a plan view of a scale according to a second embodiment of the present invention.

In the second embodiment, the additional scale coils 14-2b are added only between the main body scale coils 14-2a in the scale coils 14-2 on the upper and lower sides, and no additional scale coils are added to the scale coils 14-1 arranged at the center. It is also possible to partially omit the addition of the scale coils in such a manner.

Although the shape of the scale coil is described as a rectangular frame shape in any of the above-described embodiments, the shape of the scale coil is not limited thereto. For example, it may be a plate shape having an electrode inside the rectangle or alternatively a plate shape obtained by removing the rectangular portion.

It should be apparent to those skilled in the art that the above-described embodiments are merely illustrative which represent the application of the principles of the present invention. Numerous and varied other arrangements can be readily devised by those skilled in the art without departing from the spirit and the scope of the invention.

The invention claimed is:

1. An electromagnetic induction type absolute position measuring encoder having two or more tracks, the encoder comprising:
   two or more rows of scale coils, each of the rows including a large number of scale coils arranged on a scale along a measuring direction so as to have a scale pitch different from that of another row;
   two or more rows of transmitter coils and receiver coils arranged on a grid movable relative to the scale in the measuring direction so as to face the rows of the scale coils; and
   the track constituted by one row of the scale coils, the transmitter coil and the receiver coil,
   the encoder being capable of measuring an absolute position of the grid with respect to the scale from a flux change detected by the receiver coil via the scale coils when the transmitter coil is excited, wherein
   at least one loop-shaped additional scale coil is added between the scale coils in at least one of the rows of the scale coils, the loop-shaped additional scale coil not being connected with an coil.

2. The electromagnetic induction type absolute position measuring encoder according to claim 1, wherein the scale coil has a coil length twice or more as long as a coil length of the additional scale coil.

3. The electromagnetic induction type absolute position measuring encoder according to claim 1, wherein the receiver coil has a shape covering both of the original scale coil and the additional scale coil.

4. The electromagnetic induction type absolute position measuring encoder according to claim 3, wherein the shape of the receiver coil is a figure of eight with the top and bottom direction of the figure of eight coinciding with the measuring direction.

5. The electromagnetic induction type absolute position measuring encoder according to claim 1, wherein a signal strength detected at the receiver coil is increased to (Ia+Id)/(Ia−Id) times more than or equal to a signal strength obtained when no additional scale coil is added, where Id is an induced current component generated by a magnetic field directly entered into the original scale coil on the row to be measured from the transmitter coil, and Ia is an induced current component via the original scale coil on the other row.

6. The electromagnetic induction type absolute position measuring encoder according to claim 1, wherein a line width of the additional scale coil is adjusted so as to cancel out induced currents due to crosstalk magnetic fields from the scale coils to the receiver coil.

7. The electromagnetic induction type absolute position measuring encoder according to claim 1, wherein a line width of the scale coil is changed in accordance with a position in the measuring direction of the scale so as to cancel out induced currents due to crosstalk magnetic fields from the scale coils to the receiver coil.

8. The electromagnetic induction type absolute position measuring encoder according to claim 1, wherein three or more rows of the scale coils are provided.

9. The electromagnetic induction type absolute position measuring encoder according to claim 8, wherein the scale coils include first scale coils arranged at a scale pitch λ1 and second scale coils arranged at a scale pitch λ2 different from the scale pitch λ1 disposed on either side of the first scale coils, and further include an additional scale coil added only between the second scale coils disposed on either side of the first scale coils while no additional scale coil is added in the first scale coils at the center.

10. The electromagnetic induction type absolute position measuring encoder according to claim 1, wherein the shape of the scale coil is a rectangular frame shape.

11. The electromagnetic induction type absolute position measuring encoder according to claim 1, wherein the encoder comprises two rows of scale coils in the scale and the encoder comprises a plurality of loop-shaped additional scale coils in the two rows of the scale coils.

12. The electromagnetic induction type absolute position measuring encoder according to claim 1, wherein the encoder comprises three rows of scale coils in the scale and the encoder comprises a plurality of loop-shaped additional scale coils in at least two rows of the scale coils.

13. An electromagnetic induction type absolute position measuring encoder having two or more tracks, the encoder comprising:
two or more rows of scale coils, each of the rows including a large number of scale coils arranged on a scale along a measuring direction so as to have a scale pitch different from that of another row, each of the scale coils in one row being connected with each of the scale coils in another row by connecting coils, one row of the scale coils having a scale pitch that is different from a scale pitch of another row of the scale coils;
two or more rows of transmitter coils and receiver coils arranged on a grid movable relative to the scale in the measuring direction so as to face the rows of the scab; coils, the receiver coil in one row not being connected with the receiver coil in another row; and
the track constituted by one row of the scale coils, the transmitter coil and the receiver coil,
the encoder being capable of measuring an absolute position of the grid with respect to the scale from a flux change detected by the receiver coil via the scale coils when the transmitter coil is excited, wherein
at least one loop-shaped additional scale coil is added between the scale coils in at least one of the rows of the scale coils, the loop-shaped additional scale coil having the loop-shape disposed within one row of the scale coil and not being connected with any coil.

14. The electromagnetic induction type absolute position measuring encoder according to claim 13, wherein the encoder comprises two rows of scale coils in the scale and the encoder comprises a plurality of loop-shaped additional scale coils in the two rows of the scale coils.

15. The electromagnetic induction type absolute position measuring encoder according to claim 13, wherein the encoder comprises three rows of scale coils in the scale and the encoder comprises a plurality of loop-shaped additional scale coils in at least two rows of the scale coils.

* * * * *